(12) United States Patent
Pike (10) Patent No.: US 12,360,442 B1
(45) Date of Patent: Jul. 15, 2025

(54) CAMERA MOUNTING SYSTEM

(71) Applicant: Caleb Pike, Rockford, IL (US)

(72) Inventor: Caleb Pike, Rockford, IL (US)

(*) Notice: Subject to any disclaimer, the term of this patent is extended or adjusted under 35 U.S.C. 154(b) by 0 days.

(21) Appl. No.: 18/924,705

(22) Filed: Oct. 23, 2024

(51) Int. Cl.
 *G03B 17/56* (2021.01)
 *A45F 5/10* (2006.01)
 *A45F 5/00* (2006.01)

(52) U.S. Cl.
 CPC .............. *G03B 17/566* (2013.01); *A45F 5/10* (2013.01); *A45F 2005/1086* (2013.01); *A45F 5/1533* (2025.01)

(58) Field of Classification Search
 USPC ........................................ 396/420; 248/187.1
 See application file for complete search history.

(56) References Cited

U.S. PATENT DOCUMENTS

| | | | |
|---|---|---|---|
| 7,253,840 B2 * | 8/2007 | Kayanuma | H04N 1/00204 348/E5.025 |
| 8,718,457 B2 * | 5/2014 | Clark | G03B 29/00 396/27 |
| 9,188,839 B2 | 11/2015 | Rodriguez et al. | |
| 9,195,119 B2 | 11/2015 | Wendt | |
| 9,568,282 B1 | 2/2017 | Schorman | |
| 10,306,116 B2 * | 5/2019 | Jennard | H04N 23/54 |
| 10,511,750 B2 * | 12/2019 | Clearman | G03B 17/02 |
| 11,172,586 B2 | 11/2021 | Hermann | |
| 2017/0070681 A1 * | 3/2017 | Nattress | G09G 5/10 |

* cited by examiner

*Primary Examiner* — Clayton E. LaBalle
*Assistant Examiner* — Warren K Fenwick
(74) *Attorney, Agent, or Firm* — TAYLOR & EDELSTEIN, PC (57) ABSTRACT

A camera mounting system including a camera, a first planar structural member and a battery structure. The camera has a first surface and a second surface. The first planar structural member has a first end and a second end, the first end being connected to the first surface of the camera. The battery structure is connected to the second end of the first planar structural member.

17 Claims, 7 Drawing Sheets

CAMERA MOUNTING SYSTEM

BACKGROUND OF THE INVENTION

1. Field of the Invention

The present invention relates generally to a photographic system that extends the utility of a camera by coupling a mount to the camera and accessories to the mount.

2. Description of the Related Art

It is generally known that lenses and imaging sensors can be mounted to form cameras that may be used in vehicles to capture imaging information. Handheld cameras can be coupled to a mount such as a tripod, generally by way of a threaded fastener extending from the tripod to engage a threaded receptacle on the bottom of a camera.

Many handheld cameras include a coupling device, sometimes referred to as a shoe or a hotshoe for the attachment of a flash mechanism. With the advent of digital cameras a need for extended life batteries, stabilizing devices and other accessories are desirable to be added to the camera.

As digital cameras have become more capable, more and more devices have built-in digital cameras, such as smartphones, mobile phones, vehicles and laptop computers. Built-in cameras generally store images in the JPEG file format, although cameras in Apple's iPhone line have been known to use the HEIC format. Additional storage and power consumption of cameras becomes some of the driving factors to expand the need for additional connectable devices.

While the sales of separate cameras peaked some 15-20 years ago, the use of additional accessories to enhance the use of a camera motivated the applicant to address the issues of incorporating a system to interface a camera with accessories.

What is needed in the art is a way of coupling a general mounting system to a handheld camera for the coupling of accessories and accoutrements to enhance the use of the camera.

SUMMARY OF THE INVENTION

The present invention provides a mounting system for a camera and a method of mounting a camera for extended uses.

The invention in one form is directed to a camera mounting system including a camera, a first planar structural member and a battery structure. The camera has a first surface and a second surface. The first planar structural member has a first end and a second end, the first end being connected to the first surface of the camera. The battery structure is connected to the second end of the first planar structural member.

The invention in another form is directed to a camera mounting system to be attached to a camera having a first surface and a second surface. The camera mounting system includes first and second planar structural members, and a battery holding structure. The first planar structural member has a first end and a second end, with the first end being connectable to the first surface of the camera. The second planar structural member has a first end and a second end, the first end of the second planar structural member being connectable to the second surface of the camera. The battery holding structure is connected between the second end of the first planar structural member and the second end of the second planar structural member.

The invention in yet another form is directed to a camera mounting method including the steps of coupling and connecting. The coupling step includes coupling a first end of a first planar structural member to a first surface of a camera. The connecting step including the connecting of a battery coupling structure to a second end of the first planar structural member.

An advantage of the present invention is that it provides a Swiss army knife approach to connectivity of devices to a camera.

Another advantage is that the present invention allows for new features encapsulated in the mounting system itself such as a camera cradle.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention, in one form, and such exemplification is not to be construed as limiting the scope of the invention in any manner.

DETAILED DESCRIPTION OF THE INVENTION

Figure 1:
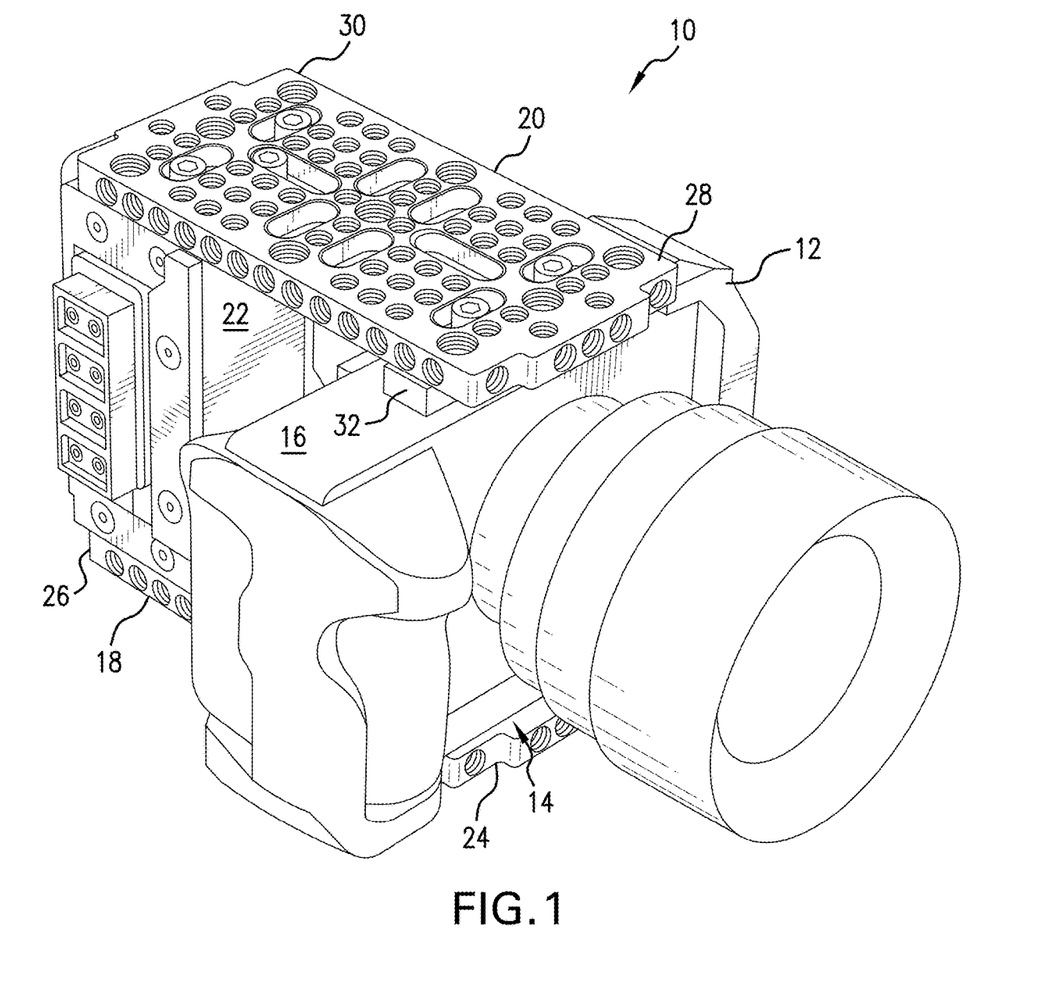
FIG. 1 is a perspective view of an embodiment of a camera mounting system of the present invention with a camera mounted thereto.
Figure 2:
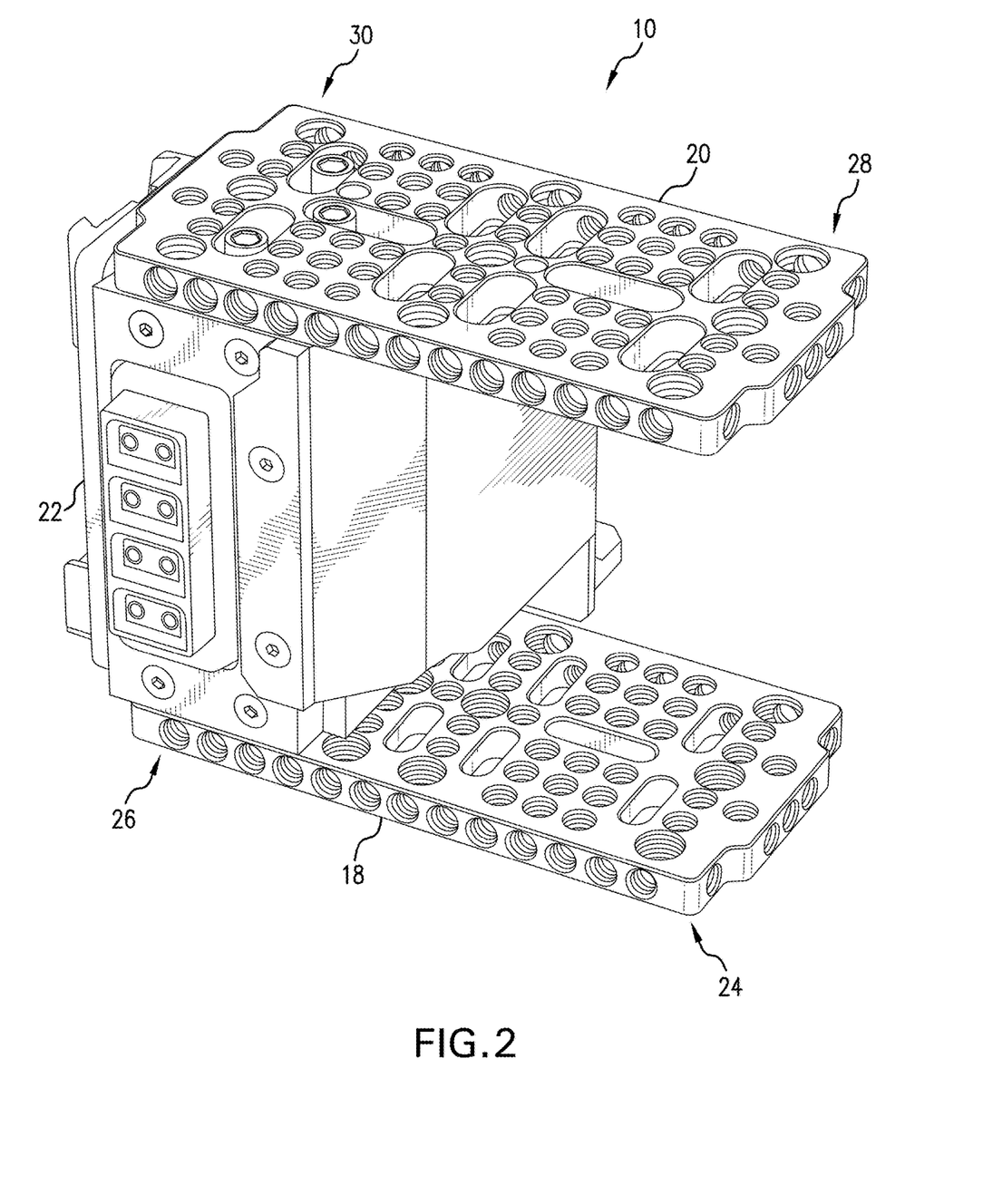
FIG. 2 is another perspective view of the camera mounting system of FIG. 1.

Referring now to the drawings, and more particularly to FIGS. 1 and 2, there is shown a camera mounting system 10 for the mounting of a camera 12 therein. Camera 12 has a first surface 14 and a second surface 16. Surfaces 14 and 16 are generally on opposite sides of camera 12 and may be parallel to each other.

Camera mounting system 10 includes a first planar structural member 18 and a second planar structural member 20, along with a battery plate 22. Battery plate 22 is also referred to as a battery structure 22 or a battery holding structure 22, to which a battery is coupled to supply electrical power to camera 12 by way of large form factor batteries to extend the run time of camera 12. Structure 22 has switched power outputs for interfacing with multiple accessories beyond camera 12. Advantageously, system 10 has a screen side mount allowing the use of the camera screen in 3 different positions (facing out, closed or flipped out 90 degrees to camera 12). System 10 has top and bottom removable mounting plates 18 and 20 that form most of the structure that allows for external accessories to be mounted by way of the plurality of mounting slots and threaded openings. Planar structural members 18 and 20 may be substantially similar or completely identical and interchangeable. Within system 10 cable management and routing is inherently built in and allowed to accommodate various configurations of camera 12. System 10 can be considered to be of a modular design, thereby allowing for future accessories and upgrades, and system 10 is completely removable from camera 12.

Camera mounting system 10 is shown coupled to camera 12. First planar structural member 18 has a first end 24 and a second end 26, and in a similar manner second planar structural member 20 has a first end 28 and a second end 30. First ends 24 and 28 can be coupled to, respectively, first surface 14 and second surface 16 of camera 12.

Battery structure 22 is connected to second end 26 of first planar structural member 18, and to second end 30 of second planar structural member 20. While first end 24 of first planar structural member 18 and first end 28 of second planar structural member 20 are respectively coupled to first surface 14 and second surface 16 of camera 12, with surfaces 14 and 16 being on opposite sides of camera 12. To accommodate various configurations of camera 12, spacer members 32 are used to allow members 18 and 20 to be parallel or at least substantially so and to adjust for a height of battery holding structure 22. This configuration allows for the distance between first surface 14 of camera 12 and second surface 16 of camera 12 to be approximately the same distance as first and second planar structural members 18 and 20 are apart at second ends 26 and 30 of first and second planar structural members 18 and 20.

Figure 3:
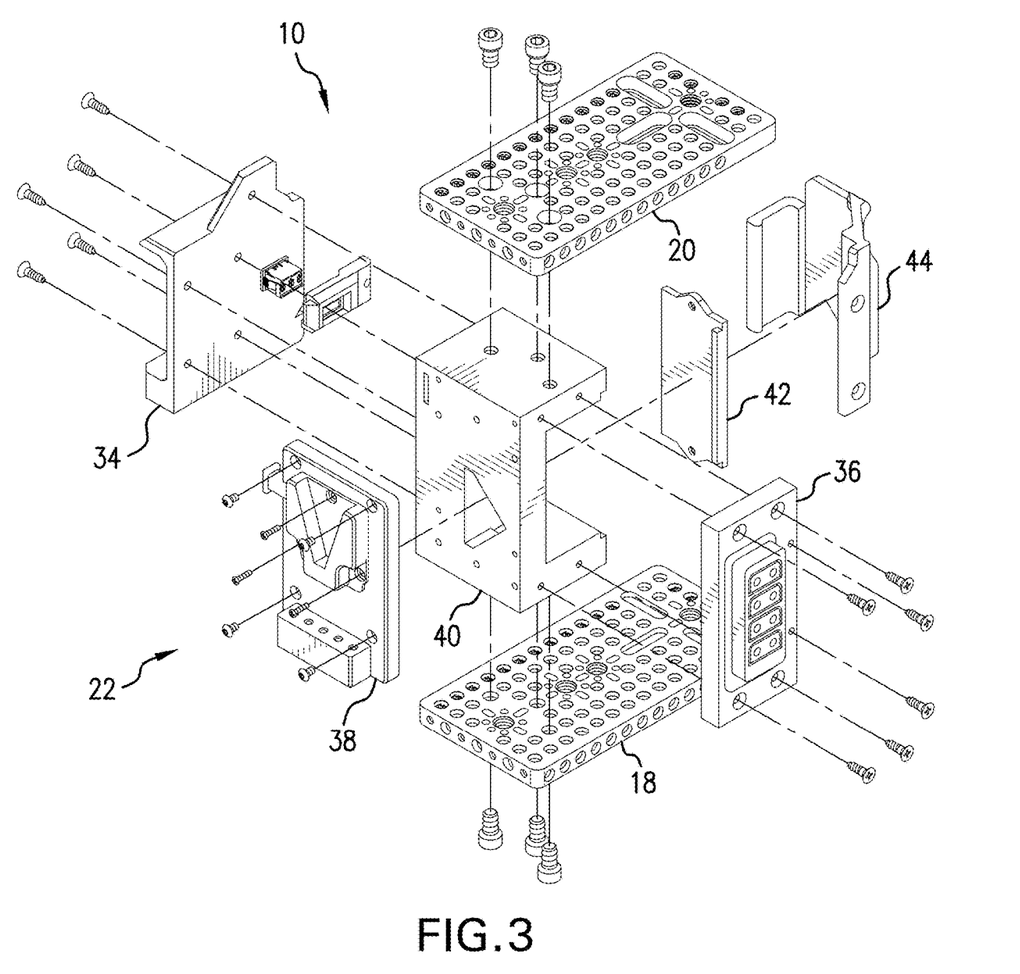
FIG. 3 is an exploded perspective view of the camera mounting system of FIGS. 1 and 2.
Figure 4:
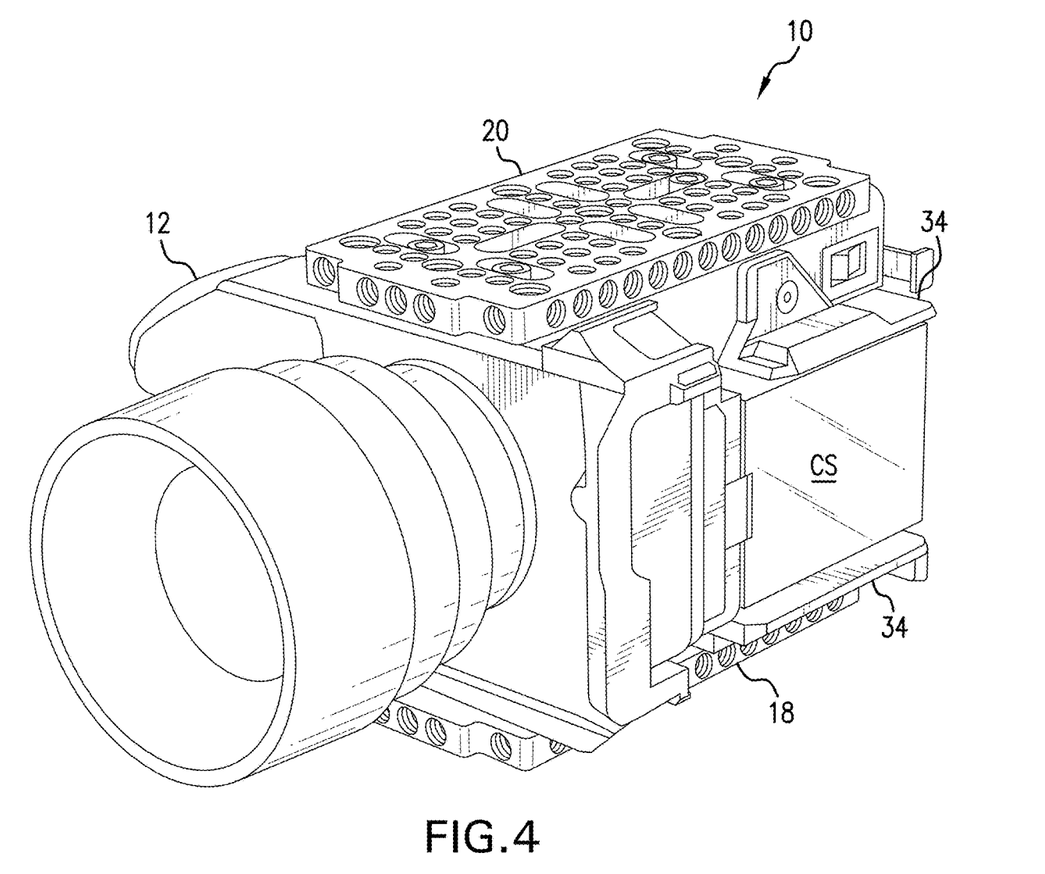
FIG. 4 is another perspective view of the camera mounting system of FIGS. 1-3, from another perspective, illustrating a screen cradle of the present invention.
Figure 5:
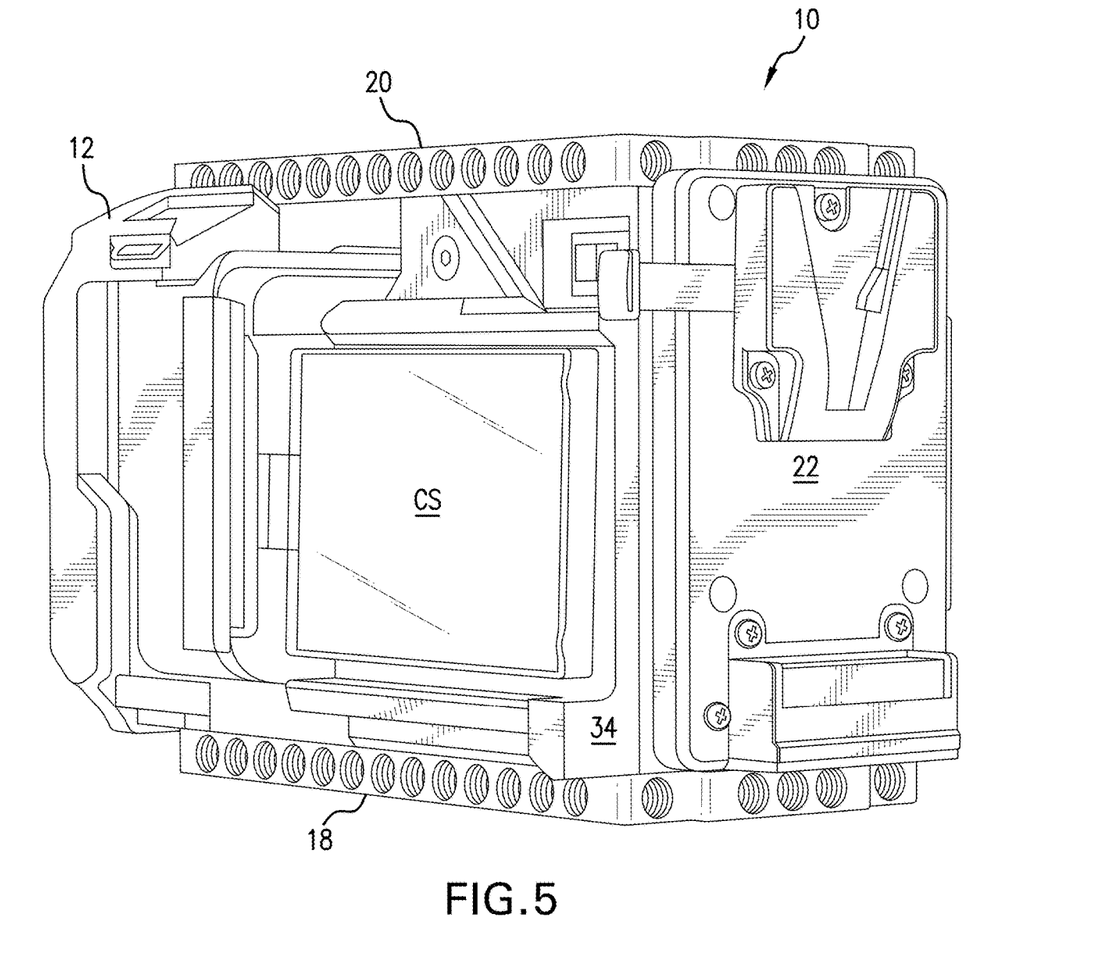
FIG. 5 is yet another perspective view of the camera mounting system of FIGS. 1-4.

Now, additionally referring to FIGS. 3-5, in FIG. 3 there is shown an exploded view of camera mounting system 10. Battery holder 22 is shown having members 34, 36, 38, 40, 42 and 44. Member 34 is a screen cradle 34 in which a camera screen CS can be positioned as shown in FIGS. 4 and 5.

Figure 6:
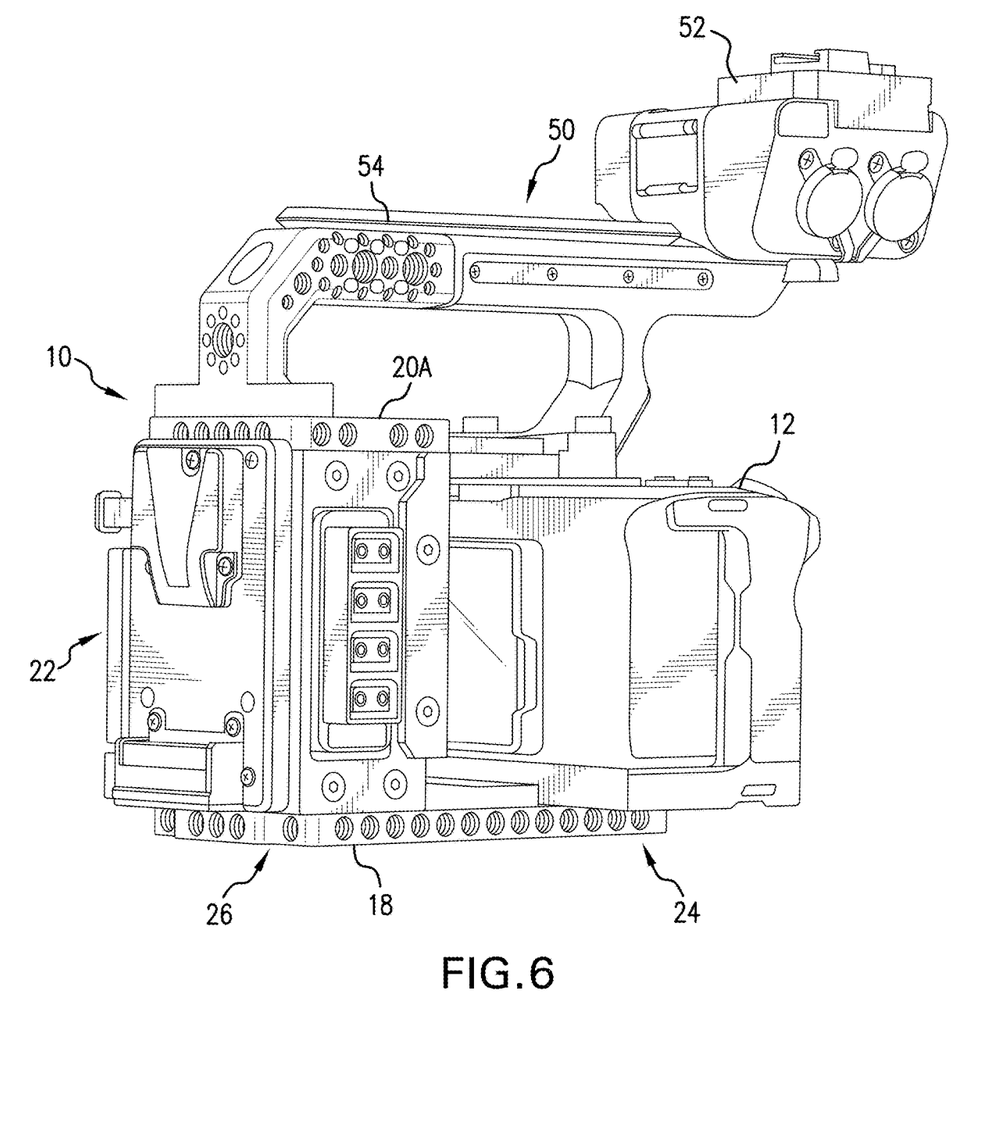
FIG. 6 is still yet another perspective view of the camera mounting system of FIGS. 1-5, additionally illustrating a handle of the present invention coupled to the top of the system.
Figure 7:
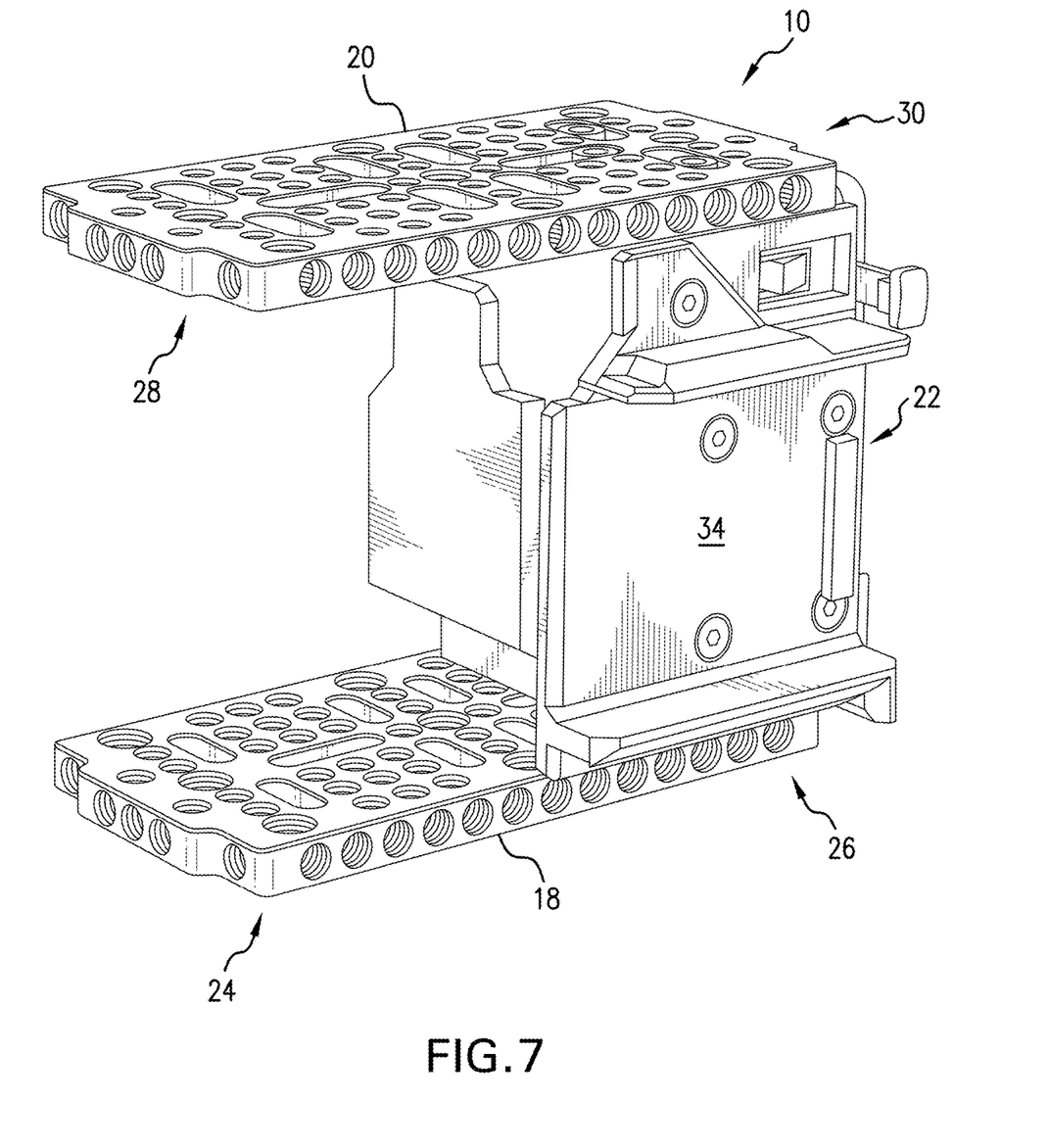
FIG. 7 is still yet another perspective view of the camera mounting system of the previous Figs. again illustrating the camera screen cradle.

Now, additionally referring to FIG. 6 there is shown a handle 50 that is coupled to a modified planar structural member 20A at the rear of handle 50 and directly to camera 12 at the fore end of handle 50. Handle 50 has a rail 54 to which accessories 52 can be mounted. Since handle 50 has a rail 54, it can be referred to as a railed handle 50, which is shown connected to the second planar structural member 20A at an aft end of railed handle 50. Railed handle 50 is also configured to be coupled at both ends to planar structural member 20 or 18 of one of the previous Figs.

Screen cradle 34 can be coupled to at first planar structural member 18 and/or second planar structural member 20 and/or other parts of battery structure 22. Screen cradle 34 has a shape to accommodate a movable screen CS of camera 12. Screen cradle 34 is oriented to accommodate screen CS in an orientation that is substantially perpendicular to the first surface 14 of camera 12 as is shown in FIGS. 4 and 5. Also, camera screen CS can also be oriented in its typical display positions to the side of camera 12. Cradle 34 is provided to position camera screen CS in a stowed position for the protection of screen CS.

Mounting system 10 is arranged to be connectable to camera 12 as discussed above and to be removable from camera 12 primarily by way of ends 24 and 28 of planar structural members 18 and 20.

The present invention also includes a camera mounting method that includes the steps of coupling first end 24 of first planar structural member 18 to first surface 14 of camera 12, and connecting battery coupling structure 22 to second end 26 of first planar structural member 18. The method also includes coupling first end 28 of second planar structural member 20 to second surface 16 of camera 12; and connecting second end 30 of second planar structural member 20 to battery coupling structure 22. First surface 14 of camera 12 and second surface 16 of camera 12 are on opposite sides of camera 12.

In carrying out this method first and second planar structural members 18 and 20 are substantially parallel to each other and can be arranged by this method by using one or more spacer blocks 32. This provides that a distance between first surface 14 of camera 12 and second surface 16 of camera 12 is approximately the same distance as first and second planar structural members 18 and 20 are apart at the second ends 26 and 30 of first and second planar structural members 18 and 20.

On a backside of cradle 34, as seen in FIG. 3, there is a power switch that toggles power from rear battery plate 40 to D-tap plate 36. For the sake of clarity cable routings are not shown but they are carried out generally internal to the outer structure of system 10.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A camera mounting system, comprising:
   a camera having a first surface and a second surface;
   a first planar structural member having a first end and a second end, the first end being connected to the first surface of the camera;
   a second planar structural member having a first end and a second end, the first end of the second planar structural member being connected to the second surface of the camera; and
   a railed handle connected to the first or the second planar structural member.

2. The camera mounting system of claim 1, further comprising a battery structure connected to the second end of the first planar structural member.

3. The camera mounting system of claim 2, wherein the second end of the second planar structural member is connected to the battery structure.

4. The camera mounting system of claim 3, wherein the first surface of the camera and the second surface of the camera are on opposite sides of the camera.

5. The camera mounting system of claim 4, wherein the first and second planar structural members are substantially parallel to each other.

6. The camera mounting system of claim 4, wherein a distance between the first surface of the camera and the second surface of the camera is approximately the same distance as the first and second planar structural members are apart at the second ends of the first and second planar structural members.

7. The camera mounting system of claim 1, further comprising a screen cradle coupled to at least one of the first planar structural member and the second planar structural member, the screen cradle having a shape to accommodate a movable screen of the camera.

8. The camera mounting system of claim 7, wherein the screen cradle is oriented to accommodate the screen in an orientation that is substantially perpendicular to the first surface of the camera.

9. A camera mounting system to be attached to a camera having a first surface and a second surface, the camera mounting system comprising:
  a first planar structural member having a first end and a second end, the first end being connectable to the first surface of the camera;
  a second planar structural member having a first end and a second end, the first end of the second planar structural member being connectable to the second surface of the camera; and
  a screen cradle coupled to at least one of the first planar structural member and the second planar structural member, the screen cradle having a shape to accommodate a movable screen of the camera.

10. The camera mounting system of claim 9, further comprising a battery holding structure connected between the second end of the first planar structural member and the second end of the second planar structural member.

11. A camera mounting method, comprising the steps of:
  coupling a first end of a first planar structural member to a first surface of a camera;
  coupling a first end of a second planar structural member to a second surface of the camera; and
  connecting a railed handle to the first or the second planar structural member.

12. The camera mounting method of claim 11, further comprising the steps of:
  connecting a battery coupling structure to a second end of the first planar structural member; and
  connecting a second end of the second planar structural member to the battery coupling structure.

13. The camera mounting method of claim 12, wherein the first surface of the camera and the second surface of the camera are on opposite sides of the camera.

14. The camera mounting method of claim 13, wherein the first and second planar structural members are substantially parallel to each other.

15. The camera mounting method of claim 12, wherein a distance between the first surface of the camera and the second surface of the camera is approximately the same distance as the first and second planar structural members are apart at the second ends of the first and second planar structural members.

16. The camera mounting method of claim 12, further comprising the step of coupling a screen cradle to at least one of the first planar structural member, the second planar structural member, and the battery structure, the screen cradle having a shape to accommodate a movable screen of the camera.

17. The camera mounting method of claim 16, wherein the screen cradle is oriented to accommodate the movable screen in an orientation that is substantially perpendicular to the first surface of the camera.

* * * * *